United States Patent [19]

van Zanten et al.

[11] Patent Number: 4,754,809
[45] Date of Patent: Jul. 5, 1988

[54] DEGRADATION OF A VISCOUS MICROBIAL POLYSACCHARIDE FORMULATION

[75] Inventors: Marinus van Zanten, Rijswijk, Netherlands; Jeffrey B. Pedley, Sittingbourne; Phillip L. Sturla, Gillingham, both of England

[73] Assignee: Shell Oil Company, Houston, Tex.

[21] Appl. No.: 36,743

[22] Filed: Apr. 10, 1987

Related U.S. Application Data

[63] Continuation of Ser. No. 811,936, Nov. 5, 1985, abandoned.

[30] Foreign Application Priority Data

Nov. 9, 1984 [GB] United Kingdom ................ 8428348

[51] Int. Cl.$^4$ ............................................. E21B 43/00
[52] U.S. Cl. ................................ 166/246; 252/8.551; 252/8.552
[58] Field of Search ............... 252/8.551, 8.552, 8.553; 166/246

[56] References Cited

U.S. PATENT DOCUMENTS

| 3,236,305 | 2/1966 | Parks . |
| 3,633,689 | 1/1972 | Christman .............................. 175/65 |
| 3,675,717 | 7/1972 | Goins et al. ........................ 166/278 |
| 3,986,964 | 10/1976 | Smithey . |
| 4,046,197 | 9/1977 | Gruesbeck et al. . |
| 4,350,601 | 9/1982 | Mosier et al. . |

FOREIGN PATENT DOCUMENTS

| 0046671 | 3/1982 | European Pat. Off. . |
| 1481991 | 8/1977 | United Kingdom . |
| 1490159 | 10/1977 | United Kingdom . |
| 1549734 | 8/1979 | United Kingdom . |
| 2036056 | 6/1980 | United Kingdom . |
| 2098259 | 11/1982 | United Kingdom . |
| 2111102 | 6/1983 | United Kingdom . |
| 2111104 | 6/1983 | United Kingdom . |
| 2111560 | 7/1983 | United Kingdom . |
| 2116230 | 9/1983 | United Kingdom . |
| 2121092 | 12/1983 | United Kingdom . |

OTHER PUBLICATIONS

Ash et al., SPE 12085, Society of Petroleum Engineers of AIME, 58th Annual Technical Conference and Exhibition, San Francisco, Calif., Oct. 5–8, 1983.

*Primary Examiner*—Herbert B. Guynn

[57] ABSTRACT

A process for the degradation with acid of a viscous microbial polysaccharide formulation which is applied in oil and/or gas reservoir operations, wherein the polysaccharide formulation contains an amount of a salt or a salt mixture which is sufficient to adjust the transition temperature of the polysaccharide such that it is close to the reservoir operating temperature. A process for the preparation of an acid degradable polysaccharide formulation and a polysaccharide formulation.

3 Claims, 2 Drawing Sheets

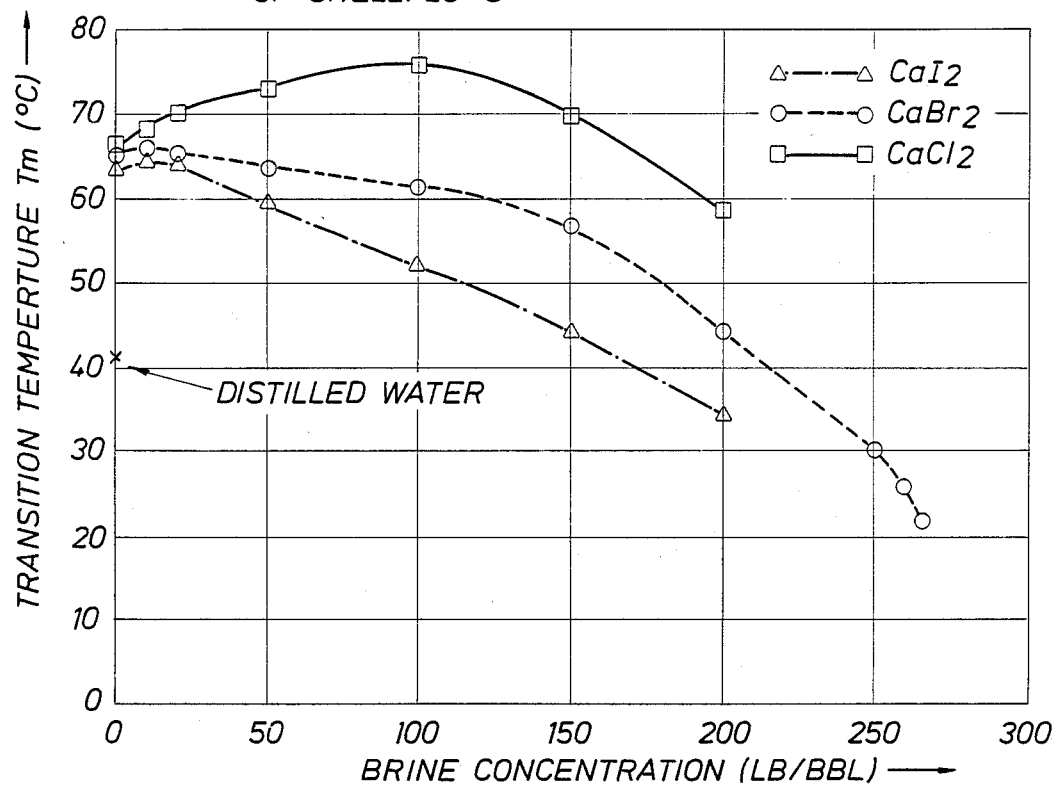
FIG.1 EFFECT OF BRINE ON THE TRANSITION TEMPERATURE OF SHELLFLO-S
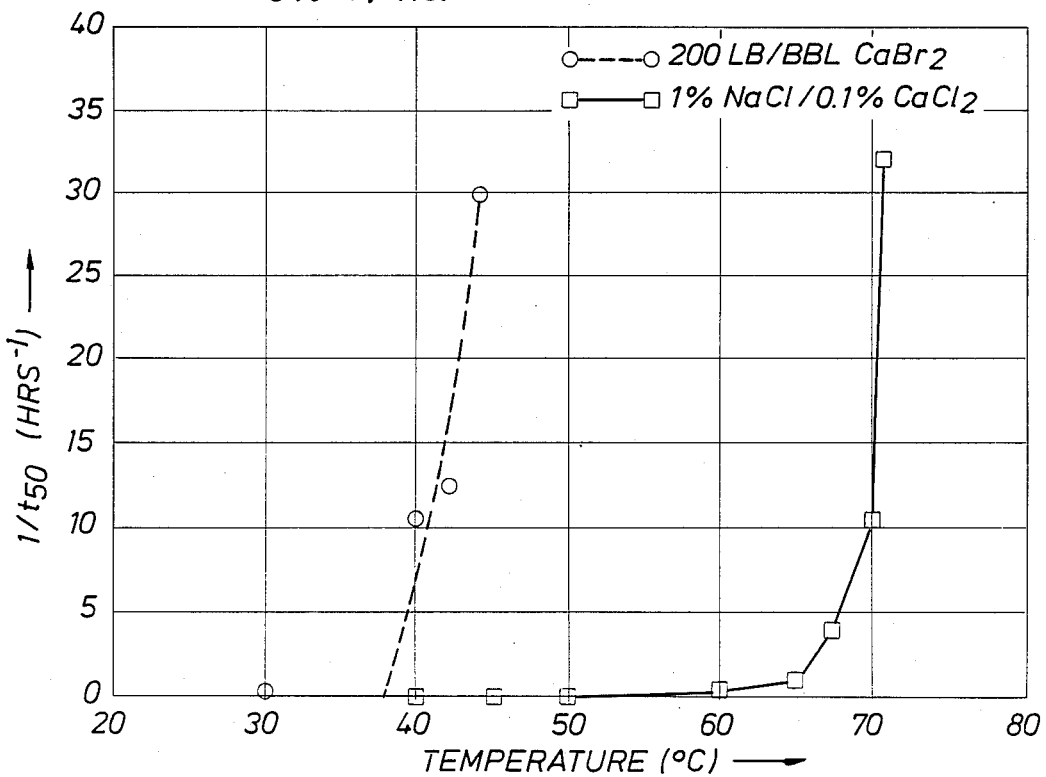
FIG.2 BREAKING OF SHELLFLO-S WITH 5% w/v HCl

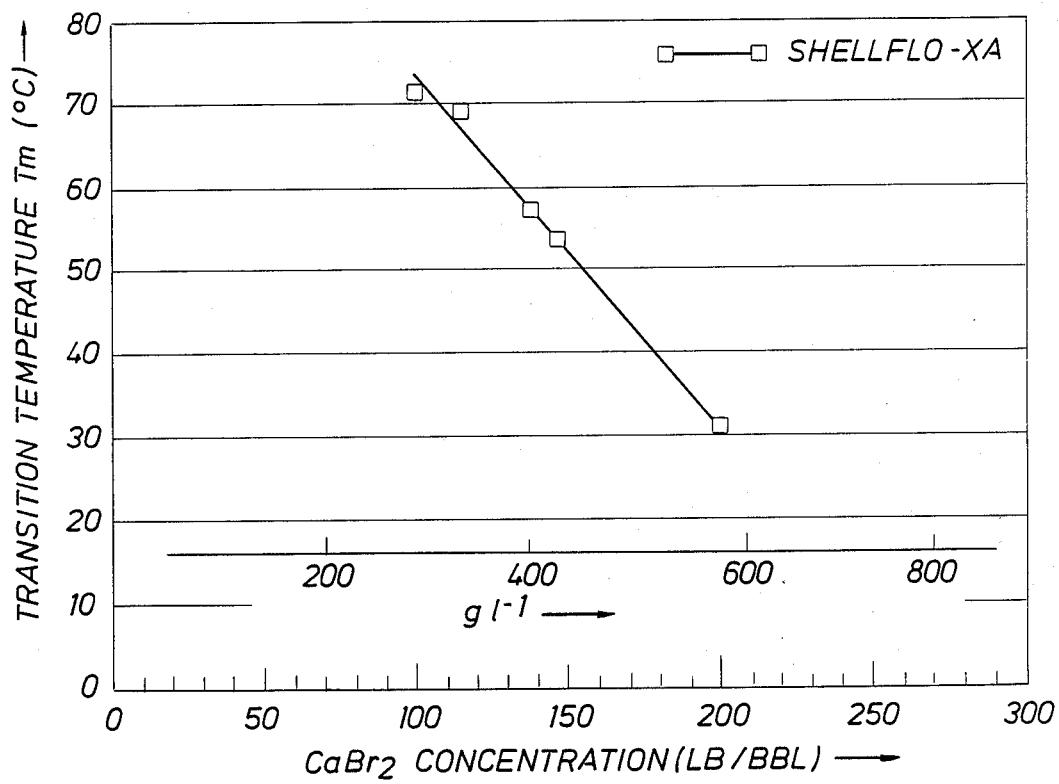
FIG.3 TRANSITION TEMPERATURE IN CaBr$_2$ SOLUTIONS
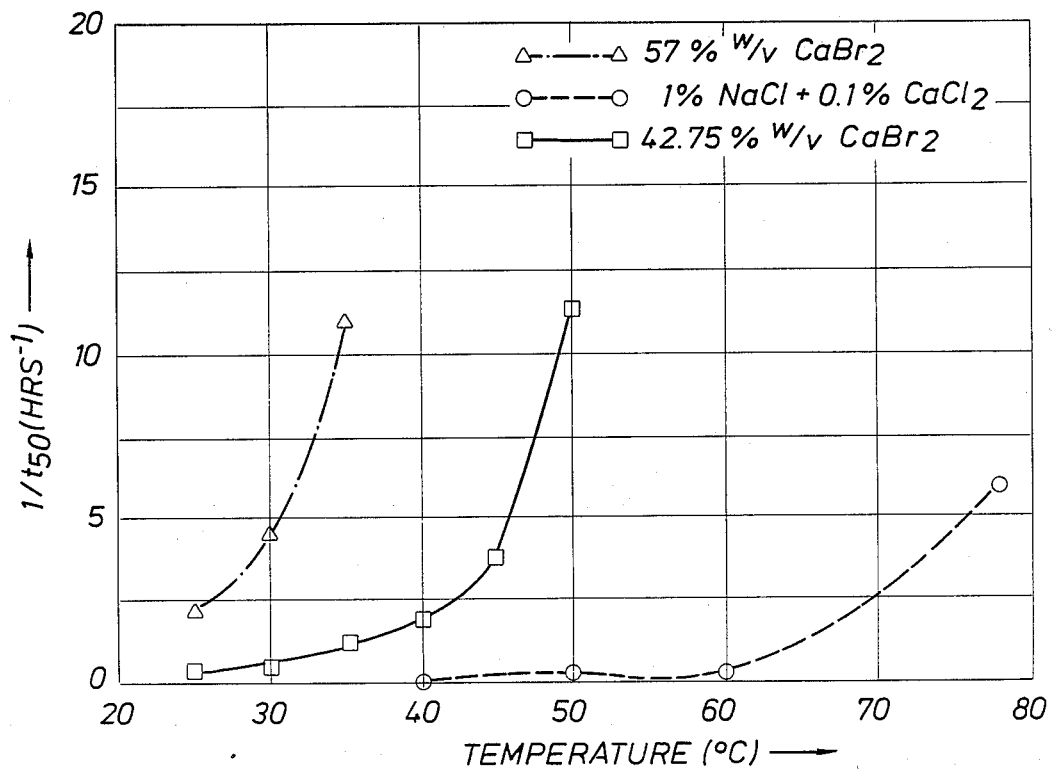
FIG.4 BREAKING OF SHELLFLO-XA WITH 5% w/v HCl

DEGRADATION OF A VISCOUS MICROBIAL POLYSACCHARIDE FORMULATION

This is a continuation of application Ser. No. 811,936, filed Nov. 5, 1985, now abandoned.

BACKGROUND OF THE INVENTION

1. Field of the Invention

The present invention relates to a process for the degradation of a viscous microbial polysaccharide formulation.

2. Description of the Prior Art

The process concerns in particular the degradation of polysaccharide formulations which are, inter alia, employed as well completion fluids, workover fluids and/or fluids used to drill oil or gas production wells. The polysaccharides are employed in these fluids to increase their viscosity. Increased viscosity reduces fluids loss and increases the solids carrying capacity of the fluid. In order to achieve acceptable productivity levels the viscous polymer solution, which has invaded the reservoir-formation during the completion, workover and/or drilling operation, must be degraded as quickly as possible. This is usually achieved either by incorporating acid into the fluid itself or by an acid post flush which should degrade any remaining fluid which might impair the permeability of the formation in the vicinity of the wellbore. It has now been found that polysaccharide formulations can be degraded unexpectedly fast when acid is added if those formulations contain high levels of certain salts. Further investigation has revealed that under such conditions the transition temperature of the biopolymer has decreased substantially. The transition temperature, $T_m$, is the temperature above which biopolymers undergo a change to a less ordered state as is explained in a paper of the Society of Petroleum Engineers of AIME (SPE 12085) which was presented at the 58th Annual Technical Conference and Exhibition held in San Francisco, Calif., Oct. 5-8, 1983. It is striking that the fast degradation of the biopolymer is in particular marked when the temperature at which acid is added is close to $T_m$. Therefore it is a great advantage that the present invention opens the possibility of controlling the transition temperature such that it comes close to the temperature of the oil and/or gas reservoir(s) which is usually the bottomhole temperature of the well. Thus the present process makes it possible that biopolymer e.g. in workover and completion brines or drilling fluids which are not used anymore can be quickly degraded.

SUMMARY OF THE INVENTION

The present invention therefore provides a process for the degradation with acid of a viscous microbial polysaccharide formulation which is applied in oil and/or gas reservoir operations, wherein the polysaccharide formulations contains an amount of a salt or salt mixture which is sufficient to adjust the transition temperature of the polysaccharide such that it is close to the reservoir temperature.

DESCRIPTION OF THE DRAWINGS

FIG. 1—A plot for Example I of transition temperature °C. ($T_m$) versus brine concentration (lb/bbl).

FIG. 2—A plot for Example II of the time to reach 50% of initial viscosity upon degradation ($1/t_{50}$) as a function of the temperature °C.

FIG. 3—A plot for Example III of transition temperature °C. ($T_m$) versus brine concentration (lb/bbl).

FIG. 4—A plot for Example IV of the time to reach 50% of the initial viscosity upon degradation ($1/t_{50}$) as a function of the temperature °C.

The fluids used in the process according to the invention may be clear brines or brines which contain acid degradable bridging particles to prevent substantial invasion of the formation by the brine. The fluids will contain large quantities of salts, usually metal halides.

Preferably the salt is selected from the group consisting of salts containing chloride, bromide and iodide ions.

Particularly preferred is the use of $CaBr_2$ and/or $ZnBr_2$ for commercial reasons or mixtures thereof in concentrations of preferably 5-80% w/v. Various polysaccharides known in the art for use in fluids for oil and gas exploration and production can be used and the polysaccharide is preferably derived from a microorganism, which is selected from the group consisting of Xanthomonas species, Pseudomonas species, Agrobacterium species, Rhizobium species, Alcaligenes species, Beijerincka species and Sclerotium species. The present invention further provides a process for preparing an acid-degradable viscous microbial polysaccharide formulation for use in oil and/or gas reservoir operations which comprises preparing a polysaccharide solution containing a sufficient amount of a salt or salt mixture to adjust the transition temperature of the polysaccharide such that it is close to the reservoir operating temperature. The present invention still further provides a microbial polysaccharide-salt formulation which comprises 0.03-5% w/v polysaccharide derived from a microorganism as hereinbefore defined, at least 50-80% w/v salt and 5-95% w/v water.

As has been described before acid may be added to the formulation and such a formulation can be regarded a preferred embodiment of the invention. Another preferred embodiment is a microbial polysaccharide-salt solution of which the transition temperature of the polysaccharide is within 0°-20° C. from the temperature of the oil or gas reservoir where the formulation is applied.

Although in particular applications of the present invention in the field of drilling workover and/or completion are mentioned it must be noted that in the context of oil field operations the present process may be used in stimulation, acidizing and enhanced oil recovery where the invention can be used to restore lost permeability arising from injection of inadequately prepared polysaccharide solution.

The present process may be carried out in such a way that the polysaccharide-salt formulation is degraded after the operation of completion and/or workover has been completed by a simple acid flush of the well. However if the salt concentration in the well is insufficient to lower the transition temperature of the polysaccharide to a temperature close to the operating temperature of the reservoir extra salt can be added before the degradation with acid is initiated. In this respect it should be noted that mixing of the high concentration salt formulation with the formation fluid can cause a decrease in the concentration of salt there where biopolymer has to be degraded. Consequently the $T_m$ of the biopolymer will rise. To overcome this dilution problem one should inject salt formulations having a concentration 1.5-2 times that concentration (or more) which is needed to bring the $T_m$ close to the reservoir temperature in case there would occur no dilution of the salt formulation.

A third mode of operation is to introduce acid and salt simultaneously to a biopolymer formulation which has to be degraded. A fourth way of carrying out the process is to mix the salt with the acid which mixture when brought into contact with the biopolymer formulation will degrade it. A fifth possibility is to contact a premixed polysaccharide/acid solution with a salt solution to initiate rapid degradation. A further way of using the process according to the present invention is to mix the polysaccharide, acid and salt at a relatively low temperature. Rapid degradation will occur when the mixture is heated to near the transition temperature of the biopolymer in that formulation. If placement of the high concentration salt formulation is not satisfactory selective placement tools may be used to overcome this problem. Such placement tools will force the high concentration salt formulation to enter the formation there where it is desired i.e. there where biopolymer is present which has to be degraded.

The present invention will be further described with reference to the Examples and the drawings.

EXAMPLE I

The decrease of Tm for "SHELLFLO"-S ("SHELLFLO" is a Shell trademark for an aqueous biopolymer solution containing about 5–10% w/v polysaccharide) was measured in salt media containing calcium salts. The "-S" indicates that the biopolymer is a succinoglucan type heteropolysaccharide produced by microorganisms such as NCIB 11592 and NCIB 11883. In FIG. 1 it is clearly shown how the Tm decreases above a certain concentration of salt. As will be appreciated the present invention provides the following practical applications. The transition temperature of a biopolymer can be quite accurately controlled by appropriate choice of brine type and concentration. The rate of degradation of the biopolymer may be controlled by selecting the appropriate brine composition for a particular reservoir temperature. As has been described before the acid may be built-in to the completion fluid to give a desired $t_{50}$ (the time to reach 50% of the initial viscosity upon degradation with acid).

EXAMPLE II

The rate of degradation of "SHELLFLO"-S was determined in two brines one of a low salinity and one of a high salinity.

| Brine 1 | Brine 2 |
|---|---|
| NaCl 1% w/v | CaBr$_2$ 57% w/v |
| CaCl$_2$ 0.1% w/v | Tm 45° C. |
| Tm 70° C. | |

The rate of degradation (loss in viscosity) was measured in the presence of 5% w/v HCL as a function of the temperature. FIG. 2 shows a plot of $1/t_{50}$ as a function of the temperature. The rate clearly increases sharply as $T_m$ is approached. At 45° C. in the lower salinity brine $t_{50}$ was 19 hours whereas, at 44° C. in the CaBr$_2$ brine, $t_{50}$ was 2 minutes.

EXAMPLE III

"SHELLFLO"-XA is a liquid concentrate of Xanthan type biopolymer (5–10% w/v active matter). $T_m$ for "SHELLFLO"-XA was measured in solutions of CaBr$_2$. FIG. 3 shows how $T_m$ decreases from about 70° C. to about 30° C. when the concentration of CaBr$_2$ increases from 100 to 200 lb/bbl (28.5–57% w/v).

EXAMPLE IV

The rate of degradation of "SHELLFLO"-XA was determined in three brines:

| Brine 1 | Brine 2 | Brine 3 |
|---|---|---|
| NaCl 1% w/v | CaBr$_2$ 42.8% wv | CaBr$_2$ 57% wv |
| CaCl$_2$ 0.1% w/v | $T_m$ 50–55° C. | $T_m$ 30–35° C. |
| $T_m >$ 100° C. | | |

The rate of degradation (loss in viscosity) was measured in the presence of 5% w/v HCl as a function of temperature. FIG. 4 shows a plot of $1/t_{50}$ as a function of temperature. The rate increases sharply in the region of $T_m$. In brine 1 at 50° C. the half life for viscosity loss, $t_{50}$, is over 4 hours whereas, in brine 2, $t_{50}$ is only 5.3 minutes at 40° C.

EXAMPLE V

Restoring permeability to a formation plugged by biopolymer

A 2 cm diameter sandpack containing 2 cm deep bed of 8–10 mesh sand placed on top of 6.5 cm deep bed of 40–100 mesh acid washed sand supported on a No. 1 porosity glass sinter was set up. The rates of flow of fluids through the sandpack under hydrostatic pressure head were measured. The initial rate of flow of water through the bed was 32 ml min$^{-1}$. The bed was then plugged by passing through 100 ml of a poorly mixed solution containing 5 g l$^{-1}$ "SHELLFLO"-XA in a brine containing 15% w/v NaCl+1.5% w/v CaCl$_2$. A further 300 ml of the brine containing 10 g l$^{-1}$ xanthan was passed through the bed. The bed was then treated with 100 ml of 5% w/v HCl. The flow rate of the acid was less than 3 ml min$^{-1}$ and hardly increased with increasing volume passed. The bed was then treated with 200 ml of 5% w/v HCl solution containing 200 lb/bbl CaBr$_2$. There was a rapid increase in flow rate to over 19 ml min$^{-1}$ after the passage of 100 ml. Water passed through this treated sandpack at a flow rate of over 25 ml min$^{-1}$ indicating the substantial restoration of original permeability.

What is claimed is:

1. A process for the degradation with acid of a viscous microbial polysaccharide formulation which is applied in oil and/or gas reservoir operations, which comprises providing in the reservoir a polysaccharide formulation comprising at least 0.03–5% w/v of polysaccharide derived from a microorganism, which is selected from the group consisting of Xanthomonas species, Pseudomonas species, Agrobacterium species, Rhizobium species, Alcaligenes species, Beijerincka species and Sclerotium species, or is derived from a mixture of at least two microorganisms selected from the above group, and an amount of a metal bromide salt or a metal bromide salt mixture within the range of 50–80% w/v which is sufficient to adjust the transition temperature of the polysaccharide such that it is within 0°–20° C. of the reservoir operating temperature, and treating said formulation with an acid to degrade said formulation.

2. A process according to claim 1 in which the salt is CaBr$_2$ and/or ZnBr$_2$.

3. A process according to claim 1 wherein the added acid is provided when the polysaccharide formulation is prepared at low temperature and rapid degradation is obtained by subsequently heating the acid-containing formulation to within 0–20° C. of the transition temperature of the polysaccharide in the formulation.

* * * * *